Sept. 17, 1968 — W. NEUBER — 3,401,882

HUMIDIFIER FOR HOT WATER HEATING SYSTEMS

Filed April 29, 1966

Walter Neuber
INVENTOR.

BY *Clarence A. O'Brien*
*and Harvey B. Jackson*
Attorneys

United States Patent Office 3,401,882
Patented Sept. 17, 1968

3,401,882
HUMIDIFIER FOR HOT WATER
HEATING SYSTEMS
Walter Neuber, Estherville, Iowa, assignor to Central
Manufacturing Company, Inc., a corporation of Iowa
Filed Apr. 29, 1966, Ser. No. 546,338
2 Claims. (Cl. 237—78)

ABSTRACT OF THE DISCLOSURE

A baseboard hot water heater in combination with a humidifier. The humidifier includes an elongated evaporation pan sitting directly on the fins of the heater and being supplied with water directly from the hot water line which supplies the heater whereby preheated water will be introduced into the pan for a humidifying evaporation thereof by the heat being directly conducted thereto through the pan.

---

This invention relates to new and useful improvements in humidifiers for hot water heating systems such as are commonly used in homes, offices, factories, and the like, and the principal object of the invention is to provide an automatic and fully self-contained attachment for the heating units of such systems so that the space heated thereby may be humidified in an efficient manner.

While it is old in the art to equip various heaters or heating systems with humidifiers, such conventional humidifiers either require periodic attention in order to keep them supplied with the necessary water, or they are connected to a local water supply which is separate from the heating system itself.

An important feature of the present invention is to provide a humidifier attachment for a hot water heating unit, which attachment receives its supply of water directly from the hot water supply pipe of the heating unit. Thus, the humidifier of the invention is self-contained and functionally integrated with the hot water heating system. Also, by utilizing hot water from the supply pipe of the heating unit, the humidifier of the invention is more effective in that it uses water which has already been preheated and is therefore ready for quick evaporation by the heat from the heating unit.

Another important feature of the invention resides in the structural arrangement of the humidifier which permits the same to be conveniently accommodated within the usual casing provided for hot water heating units. As such, the humidifier is concealed from view, protected against accumulation of dust or other foreign matter, and safe guarded against tampering.

Other advantages of the invention reside in its simple construction, efficient operation, and in its adaptability to economical manufacture as well as use in association with hot water heating units of various types.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
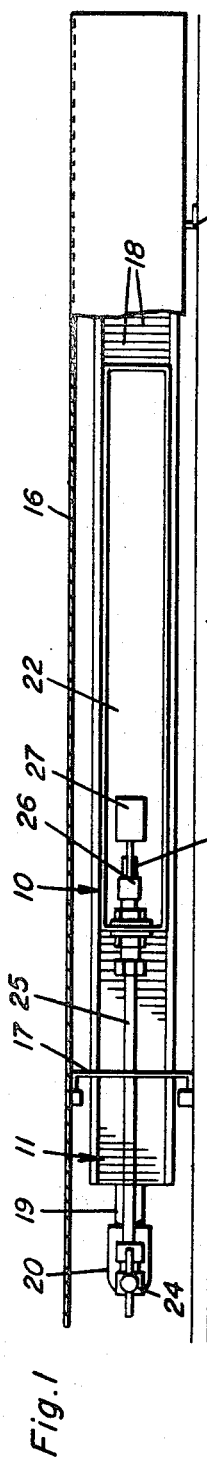
FIGURE 1 is a top plan view of the humidifier of the invention applied to a hot water heating unit, the casing of the latter being partially broken away to reveal construction.
Figure 2:
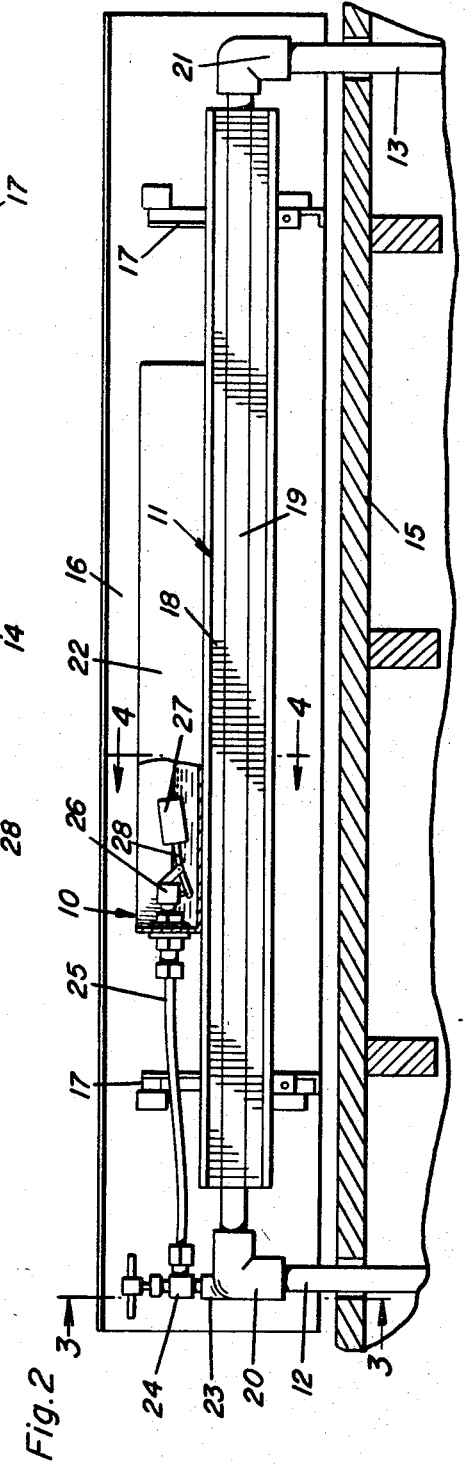
FIGURE 2 is a fragmentary side elevational view thereof.

Referring now to the accompanying drawings in detail, the humidifier of the invention is designated generally by the reference numeral 10 and is adapted for use in a hot water heating system of any conventional type which includes a heating unit 11 having a hot water supply pipe 12 and a cold water return pipe 13.

In the instance illustrated, the heating unit 11 is the floor-type unit, extending along a wall 14 adjacent the floor 15. As such, the heating unit 11 is covered by a horizontally elongated casing 16 which is supported on the wall 14 by suitable bracket means 17, all in accordance with conventional practice. The heating unit 11 itself may simple consist of a row of heat radiating fins 18 secured to a horizontal length of pipe or tubing 19 which extends between and is connected to the respective hot and cold water pipes 12, 13, by suitable elbows 20, 21, respectively.

The humidifier attachment 10 comprises a horizontally elongated, open water pan 22 which rests directly on the fins 18 of the heating unit 11 and contains a quantity of water indicated at 23, so that such water may be continually evaporated by the heat from the heating unit in order to humidify the heated space.

Figure 4:
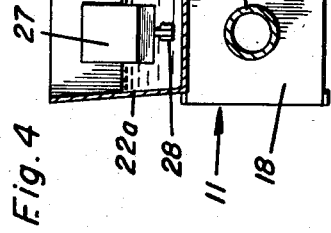
FIGURE 4 is a cross-sectional detail, taken substantially in the plane of the line 4—4 in FIGURE 2.
Figure 3:
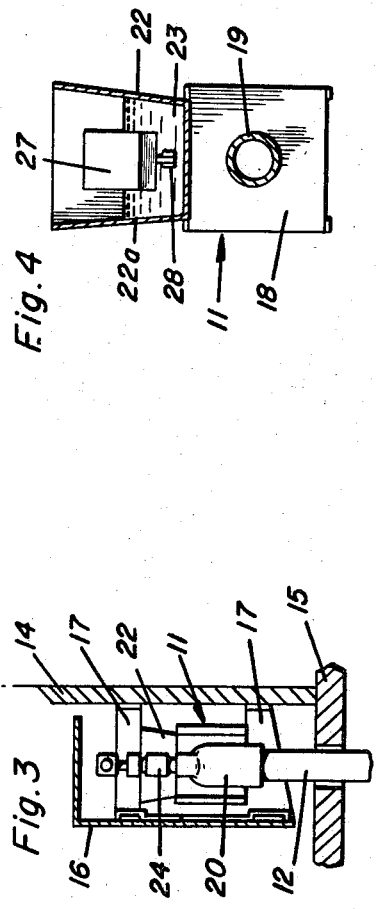
FIGURE 3 is a vertical sectional view, taken substantially in the plane of the line 3—3 in FIGURE 2.

It is to be noted that the humidifier pan 22 has outwardly slanted side walls 22a (see FIGURE 4) so that such slanted side walls may be contacted by hot air rising from the heating unit to assist in efficient evaporation of the water in the pan.

The essence of the invention resides in supplying water to the pan 22 directly from the heating system, and particularly from the hot water supply pipe 12 of the heating unit 11 itself. For this purpose, the aforementioned elbow 20 which connects the hot water supply pipe 12 to the tube 19 of the heating unit, is provided with a lateral connection 23 equipped with a manual shut-off valve 24. A water supply line 25 extends from the valve 24 to one end of the humidifier pan 22, where it is connected to a level-responsive, automatic control valve 26 disposed within that end portion of the pan. The valve 26 is of a conventional type, including a float 27 which floats on the water in the pan 22 and is operatively connected by suitable linkage 28 to the valve 26 so that the valve becomes open to admit more water when the water level in the pan falls, and vice versa.

In operation, when the heating system is in use and the manual shut-off valve 24 is open, hot water will be drawn from the supply pipe 12 of the heating unit 11 through the line 25 and discharged into the humidifier pan 22. This water, already preheated by the heating system itself, will be subject to quick evaporation in the pan 22 by the heat from the unit 11, so as to effectively humidify the heated space. It will be apparent that by supplying the humidifier pan 22 with hot water directly from the heating system itself, the humidifying operation is entirely self-contained and independent of external water supply. Thus, the humidifier attachment requires no attention or servicing, and its operation is entirely automatic. When the humidifying action is not desired, the manual valve 24 may be simply turned off, it being noted that the valve is located close to one end of the heater unit casing 16, where it is readily accessible. It will be also observed that the entire humidifying device 10, including the pan 22, the line 25 and the valve 24, is concealed within the casing 16 of the heater unit 11, so that it is effectively protected against accumulation of dust as well as against tampering.

If desired, a humidistat controlled valve (not shown) may be embodied in the water supply line 25 in addition to the manual shut-off valve 24 and the water level responsive valve 26, so that the pan 22 is filled with water only when humidifying action is desirable under humidity conditions of the heated space.

Finally, it may be noted that the humidifier attachment will also serve as an air vent for the heating system, permitting any air trapped in the hot water supply pipe 12 to be discharged through the line 25 to the atmosphere and thus making air locks in the hot water heating system virtually impossible.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a hot water heating system, the combination of an elongated hot water heating unit, a hot water supply pipe connected directly to and communicated with the heating for the supplying of hot water thereto, and a self-contained humidifier comprising an open water pan superimposed directly on and contacting said heating unit along the full length of said pan for the evaporation of water in the pan by heat conducted directly thereto, a water supply line extending directly from said hot water supply pipe to said pan, valve means responsive to the level of water in the pan for controlling the supply of water through said water supply line, said level responsive valve means being disposed completely within said pan itself and having said water supply line connected thereto, and a casing enclosing said heating unit, said pan and said water supply line being disposed within said casing, said pan being in laterally spaced relation to said casing along the length of said pan.

2. The combination of claim 1 including a manual shut-off valve associated with said water supply line for the regulation of the flow therethrough, said pan having opposed outwardly slanted full length sidewalls.

References Cited

UNITED STATES PATENTS

| | | | |
|---|---|---|---|
| 1,887,767 | 11/1932 | Lewis | 237—78 |
| 1,958,224 | 5/1934 | Anderson | 237—78 |
| 2,031,220 | 2/1936 | Lehn | 237—78 |
| 2,276,135 | 3/1942 | Woolley | 237—78 |
| 3,250,472 | 5/1966 | Smith | 237—78 |
| 3,265,305 | 8/1966 | Johnson | 237—78 |

EDWARD J. MICHAEL, *Primary Examiner.*